United States Patent
Tunney

(10) Patent No.: US 7,257,256 B2
(45) Date of Patent: *Aug. 14, 2007

(54) METHOD AND SYSTEM FOR RECOGNIZING DATE

(75) Inventor: William Patrick Tunney, Montreal (CA)

(73) Assignee: SAP AG, Walldorf (DE)

( * ) Notice: Subject to any disclaimer, the term of this patent is extended or adjusted under 35 U.S.C. 154(b) by 731 days.

This patent is subject to a terminal disclaimer.

(21) Appl. No.: 10/625,597

(22) Filed: Jul. 24, 2003

(65) Prior Publication Data

US 2005/0022105 A1    Jan. 27, 2005

(51) Int. Cl.
*G06K 9/00* (2006.01)
(52) U.S. Cl. .................. 382/187; 382/188; 382/203; 345/179; 715/541
(58) Field of Classification Search .......... 382/181–82, 382/209, 187–188, 203, 317, 218, 21; 345/179–181, 345/173; 434/256–257; 715/500, 541
See application file for complete search history.

(56) References Cited

U.S. PATENT DOCUMENTS 6,081,261 A * 6/2000 Wolff et al. .................. 345/179
6,666,376 B1 * 12/2003 Ericson ....................... 235/454

OTHER PUBLICATIONS

IBM Research, "Pen Technologies"; Retrieved from the Internet: Nov. 6, 2003< URL: http://www.research.ibm.com/electricInk/>.
Gyricon, LLC., "SmartPaper", Retrieved from the Internet Nov. 10, 2003<URL http://www.gyriconmedia.com/technology.asp>.

* cited by examiner

*Primary Examiner*—Matthew C. Bella
*Assistant Examiner*—Shefali Patel
(74) *Attorney, Agent, or Firm*—Kenyon & Kenyon LLP

(57) ABSTRACT

A method and system for recognizing date. An embodiment of a method for recognizing a date includes receiving a set of coordinates from a capture device, the set of coordinates indicating where on a paper form a set of marks was made without the use of a graphical user interface, and mapping the set of coordinates to a date. The method enables a processor to accurately and quickly determine date information entered on a piece of paper attached to the capture device, independent of the user who enters the date information. Exemplary applications include a field survey and inventory.

12 Claims, 5 Drawing Sheets

FIG. 3

METHOD AND SYSTEM FOR RECOGNIZING DATE

BACKGROUND

Handwriting recognition software has made it possible to digitally capture handwriting and transform it into digital characters using an input capture device and a computer. The capture device may be a flat panel device that allows a user to enter normal handwritten notes onto a piece of paper attached to the capture device while information about the coordinates of the pen strokes is digitally recorded by the capture device. The capture device can later upload the digitally recorded handwritten notes into a computer where an uploading program receives and stores the handwriting strokes in memory, resulting in two copies of a document, namely the original handwritten version and a second, digitally encoded version.

Digital handwriting capture is useful when data must be entered into a computer program for processing, but original handwritten copies must be retained for legal or verification purposes. In these instances, it would be helpful to have handwriting automatically transformed into digital characters and transferred to a computer program without manual data entry. This may be achieved by placing a printed paper form with clearly defined input fields on a capture device, digitally capturing the handwritten notes in these input fields on the capture device, and uploading the digital notes to the computer. A recognition program may then interpret the digitally recorded handwritten notes within these input fields and transform them into a digitally encoded representation, which can be automatically entered into the computer program in the same manner as if the notes were manually entered via a keyboard.

However, the problem with these systems is that handwriting recognition software is generally not 100% accurate. Conventionally, an accuracy of approximately 90% can be reached, but only after a user has gone through a series of arduous user-specific training sessions that allow the recognition software to adjust to the style of a particular user. So, time is lost by having to train the software. But, even so, there may still be multiple transformation errors because of the margin for error in current handwriting recognition software.

Errors are particularly prevalent when a user enters calendar date information in numerical form. For example, if an input field is provided for date entry and no format is given, a user may enter the date in one of many formats. Dec. 2, 1975 may appear as 12.02.1975 or 12/02/75 in the U.S. and 02.12.1975 or 02/12/75 in Europe, for example. The ambiguous nature of the date field results in difficulty in resolving handwritten input as a date understood by the computer program that will later use this information. Additionally, even if separate fields are provided for day, month, and year and the expected format is clearly marked on the printed form, users may still unintentionally enter the date in an incorrect format if they ignore this additional instruction.

Finally, even if users correctly follow the format required, other difficulties may arise when resolving individual numbers. Different cultures may write numbers differently. For example, the handwritten German 1 closely resembles a 7 and is interpreted as such by handwriting recognition software developed in the U.S. Or handwriting recognition engines may lack robustness in interpreting numbers. For example, handwriting recognition engines that are trained on a specific user's input may not correctly interpret hastily written numbers by the specific user and can not at all interpret numbers from a different user. In some cases, the number 8 could easily be interpreted as the letter B.

Some systems have tried to solve these problems with date recognition by providing graphical user interfaces through which a user may select date information from pull-down menus. In these systems, a more complex input/output device than the capture device must be used to display the graphical user interfaces. Such a device could be expensive and too bulky to carry, particularly for field surveys, field inventory, etc., for which the capture device is ideally suited.

Accordingly, there is a need in the art for a simple and natural way to improve the recognition accuracy of calendar date information entered by a user onto printed paper forms attached to capture devices independent of the user who inputs the information.

SUMMARY OF THE INVENTION

Embodiments of the present invention provide a simple and natural method to improve recognition of calendar date information. These embodiments provide date information by making marks on a paper data form corresponding to the month, day, and year, while a capture device captures when and where on the paper data form the marks were made. A method includes a processor receiving capture data from the capture device, where the capture data is captured simultaneously with writing made on the paper form. The method further includes the processor comparing the capture data with a plurality of unique positions stored in memory in association with a plurality of calendar dates printed on the paper form, retrieving from memory the calendar date associated with the unique position that matches the capture data, and storing in memory the retrieved calendar date as the writing made on the paper form. The capture data is advantageously generated by simply using a piece of paper and the capture device without having to rely on more complex, bulky devices with graphical user interfaces.

Embodiments of the present invention also provide a system through which date information may be recognized. The system may include a memory and a processor for receiving capture data corresponding to a set of marks made on a paper data form attached to a capture device and mapping the capture data to a date.

BRIEF DESCRIPTION OF DRAWINGS

FIG. 3 is an exemplary paper data form that includes date information to be filled out according to an embodiment of the present invention.

DETAILED DESCRIPTION

Embodiments of the present invention provide a method and system for recognizing calendar date information from a paper data form attached to a capture device. Date information on the paper may be in the form of a set of boxes representing the months of the year, the days of the month, and a current span of years. A user may simply fill in the boxes corresponding to the correct date. The capture device may digitally capture the pen strokes the user makes when filling in the boxes and upload this capture data to a computer for date recognition according to embodiments of the present invention. Exemplary applications of these embodiments include field surveys, field inventory, and other applications where paper forms are the predominant way data is recorded and device portability and ease of use are preferable.

In embodiments of the present invention, the computer's processor may receive the capture data from a capture device to which a paper data form was previously attached. The capture data format may be a time ordered sequence of (x,y) coordinates, indicating when and where on the data form a set of marks (or pen strokes) was made to fill in the correct date. This capture data may then be compared to a set of predefined coordinates stored in the computer's memory which indicates the expected positions of each month, day, and year on the data form. The predefined data that matches the capture data may be determined and the corresponding month, day, and year stored in memory for later use; hence, the date is recognized. In an alternate embodiment, the capture data format may be a sequence of vectors (x, y, t) or any format that appropriately represents the user's pen strokes.

Instead of having to rely on handwritten numbers or a variety of date formats, embodiments of the present invention may use the capture data of the filled in boxes to determine the date. Accordingly, these embodiments advantageously provide a simple and natural way to accurately recognize data information. Additionally, problematic handwriting recognition need not be done, resulting in reduced data ambiguity and improved speed of data entry.

Figure 1:
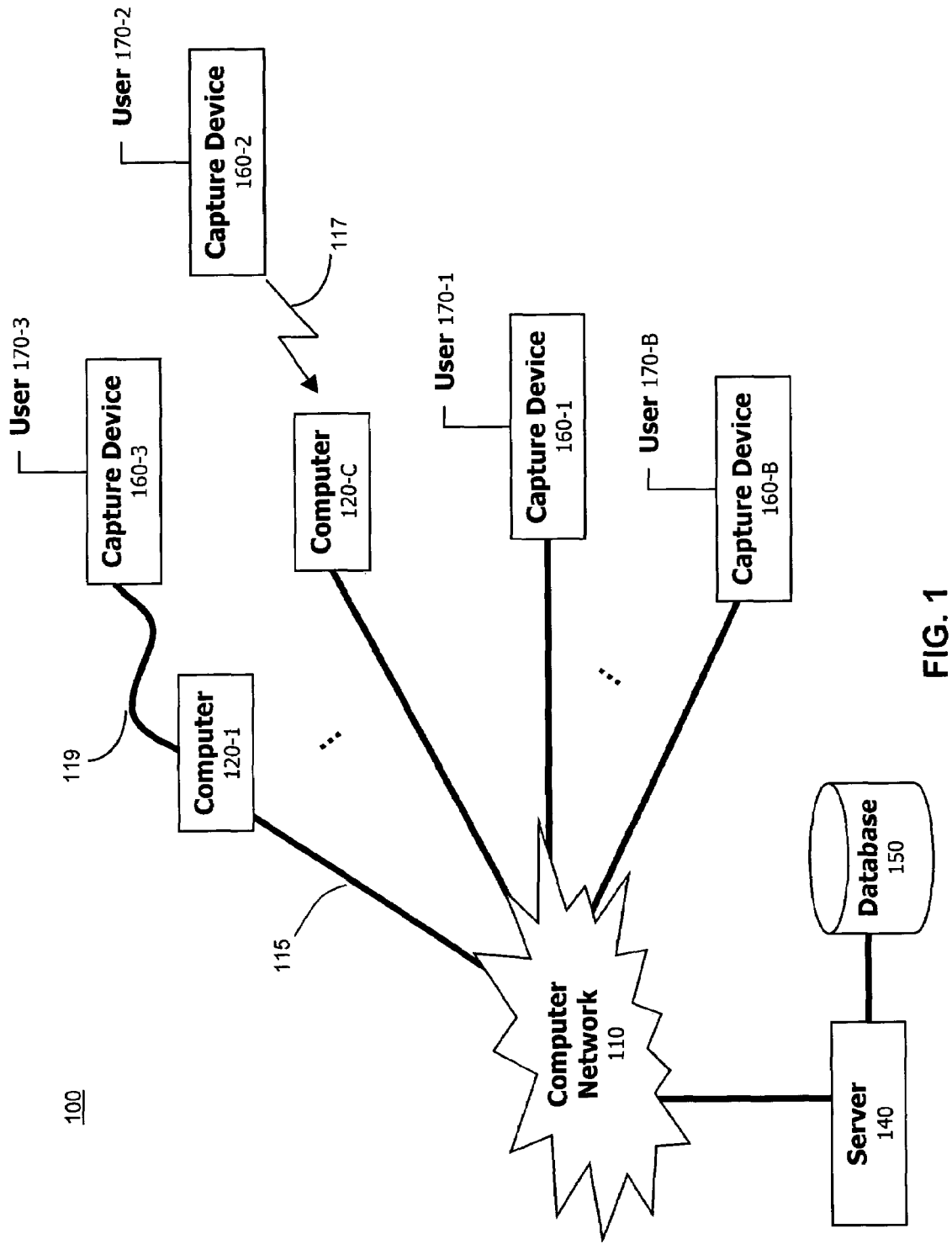
FIG. 1 is an exemplary computer network used to recognize the date according to embodiments of the present invention.

FIG. 1 shows an embodiment of an exemplary network that may be used to implement embodiments of the present invention. The exemplary network system 100 may include, but is not limited to, a computer network 110, computers 120-1 through 120-C, where C is an integer, capture devices 160-1 through 160-B used by users 170-1 through 170-B, where B is an integer, to input date information, a server 140, and a database 150 storing various date coordinates used by the computers. These components may be linked to the network 110 via network links 115. The network 110 may be a LAN, WAN, Internet, or any like structure capable of connecting components and transmitting data. The network links 115 may include physical wiring, wireless connections, or any like transmission configuration capable of transmitting data. Alternatively, a capture device 160 may be directly linked via a wireless link 117, a COM cable 119, or any like connector, to a computer 120.

The capture device used in embodiments of the present invention may include a portable input device whose appearance and operation resembles that of a traditional clipboard. The capture device may include a flat panel onto which a piece of paper may be attached and pens used to write on the paper thereby entering data to the capture device. The paper generally replaces a graphical user interface that is included in most input devices. So, typically, the capture device does not include a graphical user interface. The pen strokes made on the paper may be stored in memory on the capture device for later uploading to a computer via a modem, cable, or other transmission device in communication with a port of the capture device. An example of the capture device is the CrossPad™ manufactured by IBM.

In an embodiment, the capture device may include software for interacting with a user and for uploading capture data to the computer. The capture device may include a series of built-in buttons that may be configured to initiate given commands. For example, capture data may be uploaded to the computer via the wireless link, COM cable, or the like, by the user pressing some of the buttons to initiate the upload process. After the upload completes, the user may delete the capture data from the capture device. The capture device may include a small text-based display to show short text messages to the user.

In an alternate embodiment, the capture device may include local intelligence for performing recognition and uploading the recognized data to the computer for further processing.

Since digital handwriting capture is not limited to physical flat panel devices, in another alternative embodiment the capture device may include electronic reusable paper, for example. Electronic reusable paper is designed to have the look and feel of normal paper, except that it contains tiny sensor network technologies that provide digital display and capture of handwritten notes. Similar to a flat panel device, data can be captured, except that in the case of electronic reusable paper that data is collected and stored by the paper itself. Data collection from electronic reusable paper may be implemented in many ways, including attaching the paper to a clipboard containing the electronics required to retrieve data from the electronic reusable paper and forwarding the data obtained using standard methods. An example of electronic reusable paper is SmartPaper manufactured by Gyricon LLC.

Figure 2:
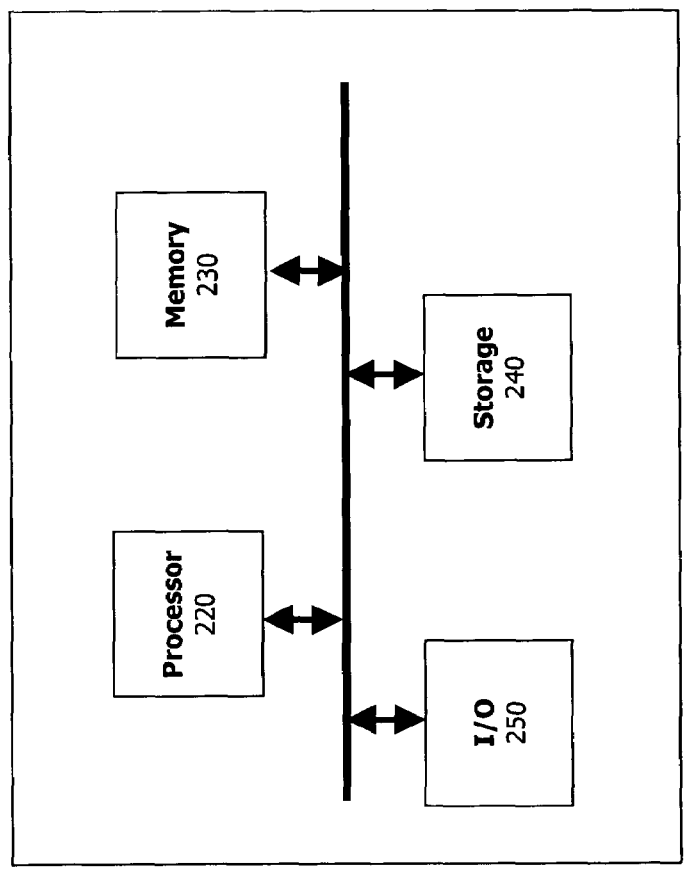
FIG. 2 is an exemplary computer used to recognize the date according to embodiments of the present invention.

FIG. 2 is a block diagram of an exemplary computer that can implement embodiments of the present invention. The computer 200 may receive capture data from the capture device according to embodiments of the present invention. The computer 200 may include, but is not limited to, a processor 220 provided in communication with a system memory module 230, a storage device 240, and an I/O device 250. The processor 220 may perform data recognition with the capture data received from the capture device. The memory 230 may store program instructions to be executed by the processor 220 and also may store variable data generated pursuant to program execution. In practice, the memory 230 may be a memory system including one or more electrical, magnetic, or optical memory devices. The I/O device 250 may include a docking station for interface to the capture device 160 to receive the capture data and transmit any other appropriate data between the capture device 160 and the computer 200.

In embodiments of the present invention, a paper form may have printed thereon date information, including 12 months, 31 days, and a current span of years. Each possible value for month, day, and year may occupy a unique spatial position on the paper form. When a user marks a date on the form by selecting a month, day, and year, the positions of the user's marks are unique to that date. These positions may be captured by the capture device and later uploaded to a computer for processing. Hence, the computer may determine the calendar date based on these unique positions.

Figure 3:
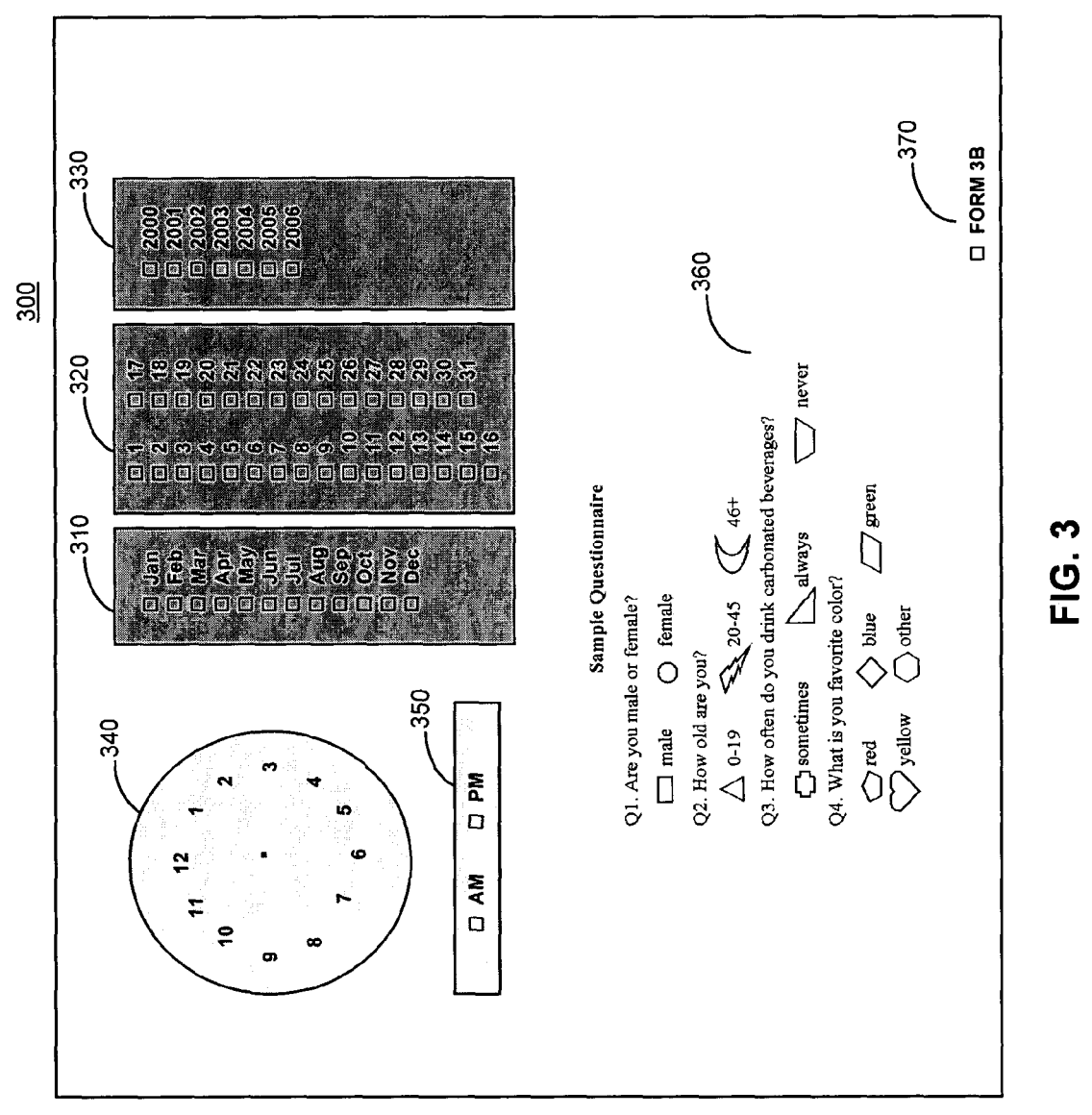
Figure 4:
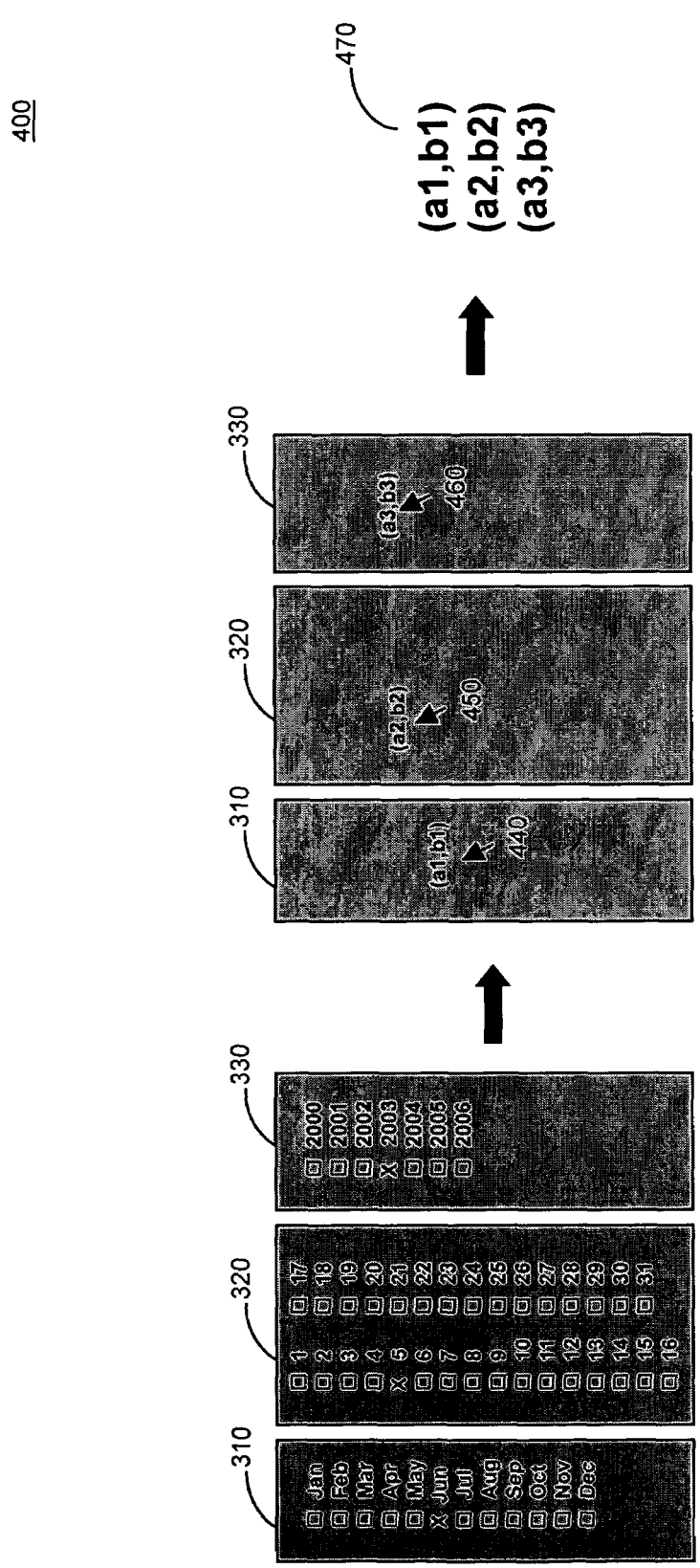
FIG. 4 is an exemplary data capture format according to an embodiment of the present invention.

FIG. 3 is an example of a paper data form in which the date information is printed in unique positions as described. In this example, the data form 300 may include, but is not limited to, date information comprising a first group of boxes 310 listing the 12 months in a year, a second group of boxes 320 listing 31 days in a month, and a third group of boxes 330 listing a current span of years. Each box 310, 320, 330 occupies a unique position on the data form 300, which, when marked by the user, may be determined based on that position of the mark. FIG. 4 will further illustrate this.

The data form 300 may also include time information comprising a clock 340 and a couple of boxes 350 listing "AM" and "PM." The data form 300 may also include a survey 360 to be filled out and the identification 370 of the data form.

The data form 300 may be attached to the capture device 160 and the correct date boxes filled in from the first, second, and third groups of boxes 310, 320, 330. The coordinates of the marks made to fill in the boxes may be recorded on the capture device 160 and later uploaded to the computer 120 for processing according to embodiments of the present invention. The boxes may be filled in by shading the entire box or making a checkmark, an "X", or any discernible indicator that the box has been selected.

To accurately capture the correct coordinates of the date information, the data form 300 should first be properly oriented on the capture device 160 and firmly attached to prevent movement. In one embodiment, a border or like markers may be printed on the face of the capture device indicating where the data form 300 should be attached. Alternatively, the data form 300 may have printed in each corner a hash mark or like markers. A user first would write on the paper form at the hash marks prior to marking the form with date information. The coordinates of these hash marks may be captured and uploaded to the computer where used as reference points for the coordinates of the date information.

Different data forms 300 may have the date information 310, 320, 330 in different positions and/or formats on the form. Hence, the identification 370 of the data form may be uploaded to the computer 120 so that the computer 120 may retrieve the appropriate predefined coordinates. In one embodiment, the form identification 370 may have a uniquely positioned box associated with it to be filled in by the user. The coordinates of the filled-in box may indicate to the computer 120 which data form is being used.

It is to be understood that the layout of the date information on the form is not limited to groups of boxes, as shown in FIG. 3. The date information may have any layout that allows the user to mark a date on a form without having to rely on handwriting recognition software. For example, in an alternate data form, the day information 320 may resemble a page of a calendar and a day in the calendar filled in.

FIG. 4 illustrates an example of the capture data format that may be used in embodiments of the present invention. In this example, the user filled in, using "X" marks, the appropriate boxes 310, 320, 330 on the paper data form to indicate the date Jun. 5, 2003. The capture device digitally captured these "X" marks as time ordered coordinates 440, 450, 460. Here, (a1,b1) are the unique coordinates for the "Jun" box, (a2,b2) are the unique coordinates for the "5" box, and (a3,b3) are the unique coordinates for the "2003" box. The user checked the boxes in the order of "Jun.," "5," "2003." Hence, the corresponding coordinates were uploaded to the computer in that order, as illustrated by 470. The processor 220 may map the unique coordinates to the month, day, and year, i.e., Jun. 5, 2003, to which they belong. The processor 220 may further use the ordering as indication of when the marks were made, i.e., relative to each other.

Figure 5:
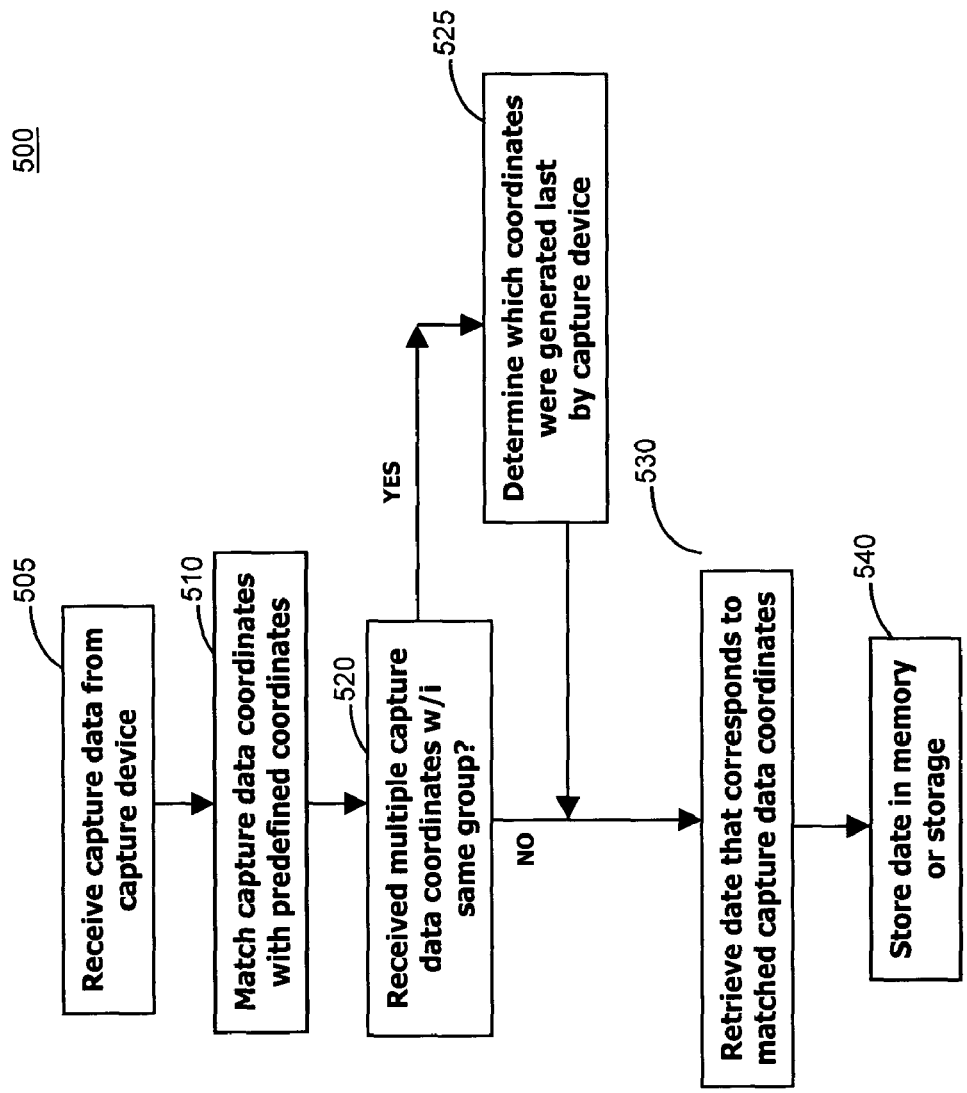
FIG. 5 is a flowchart of an embodiment of a method according to the present invention.

FIG. 5 is a flowchart of an embodiment of a method for recognizing date information according to the present invention. The processor 220 may receive (505) capture data from the capture device 160. As stated previously, the capture data may include, but is not limited to, a time-ordered set of coordinates indicating when and where on a paper data form a set of marks was made to fill in the correct date. The processor 220 may then compare (510) the set of coordinates with a set of predefined coordinates in memory 230 or storage 240 to find a match for the month, day, and year. The predefined coordinates may define the expected unique positions of marks on the paper data form for each month, day, and year.

In a system where a variety of paper data forms may be used, the processor 220 may also receive the form identification from the capture device 160. The form identification may be indicated by a set of coordinates, vectors, etc., indicating where on the paper data form the form mark was made. Prior to retrieving the predefined coordinates, the processor 220 may compare the form identification coordinates with predefined identification coordinates to find a match. The processor 220 may then determine the predefined coordinates in memory 230 or storage 240 based on the form identification and compare (510) the captured set of coordinates with these determined predefined coordinates.

When a user incorrectly fills in the date information and then corrects the mistake, the capture device 160 records multiple coordinates within the same group of boxes for the month and/or day and/or year. For example, if the user mistakenly selected the month as October, scratched it out, and then correctly selected the month as November, there would be three discrete sets of captured coordinates in the group of month boxes—a first set made in selecting October, a second set in scratching out October, and a third set in selecting November—where each set would be spaced out in time. In this case, the processor 220 will have incorrectly received multiple coordinates. However, as previously described, the capture device 160 captures the time when the mark was made, either implicitly, in the ordering of the sequence of (x,y) coordinates, or explicitly, in the vector coordinates (x,y,t), for example. So, the processor 220 solves this problem of multiple coordinates using the time data.

If the processor 220 receives (520) multiple coordinates within a group, i.e., finds multiple matches with the predefined coordinates, the processor 220 may determine (525) the set of coordinates in the group that was captured last by the capture device 160. This last set corresponds to the correct marks made by the user on the data form and, hence, the correct predefined coordinates.

Next, the processor 220 may retrieve (530) from memory or storage the date associated with the predefined coordinates that match the captured set of coordinates. The processor 220 may then store (540) the month, day, and year as the date the user marked on the form.

The processor 220 may alternatively retrieve the predefined coordinates from memory or storage, one at a time or together, prior to the comparison with the captured set of coordinates and then store the month, day, and year that match the captured set of coordinates as the date the user marked on the form.

In an alternate embodiment, the capture device 160 may perform both the data capture and the date determination. After which, the capture device 160 may upload the date to the computer 120 for further use or storage.

Embodiments of the present invention may be implemented using any type of computer, such as a general-purpose microprocessor, programmed according to the teachings of the embodiments. The embodiments of the present invention thus also includes a machine readable medium, which may include instructions used to program a processor to perform a method according to the embodiments of the present invention. This medium may include, but is not limited to, any type of disk including floppy disk, optical disk, and CD-ROMs.

It may be understood that the structure of the software used to implement the embodiments of the invention may take any desired form, such as a single or multiple programs. It may be further understood that the method of an embodiment of the present invention may be implemented by software, hardware, or a combination thereof.

The above is a detailed discussion of the preferred embodiments of the invention. The full scope of the invention to which applicants are entitled is defined by the claims hereinafter. It is intended that the scope of the claims may cover other embodiments than those described above and their equivalents.

What is claimed is:

1. A method comprising:
    receiving a set of coordinates from a capture device, the set of coordinates indicating where on a paper form a set of marks was made without the use of a graphical user interface; and
    mapping the set of coordinates to a date,
    wherein the mapping includes:
        retrieving from memory predefined coordinates indicating where each set of marks corresponding to a date is expected to be made on the capture device;
        comparing the set of coordinates to the predefined coordinates;
        determining which of the predefined coordinates is the closest match to the set of coordinates; and
        storing the date corresponding to the determined predefined coordinates.

2. The method of claim 1, wherein the received coordinates include time ordered (x,y) coordinate pairs.

3. The method of claim 1, wherein the received coordinates include vector coordinates (x,y,t).

4. The method of claim 1, further comprising:
    if the set of coordinates conflict, selecting the coordinates of the conflicting set that were captured last as the set of coordinates.

5. The method of claim 4, wherein the set of coordinates further indicates when the set of marks was made.

6. The method of claim 4,
    wherein the paper form is attached to the capture device, the form including a plurality of boxes, a first group of the boxes being associated with 12 months in a year, a second group of the boxes being associated with 31 days in a month, and a third group of the boxes being associated with a current span of years,
    wherein each box in the first group corresponds to one of the months, each box in the second group corresponds to one of the days, and each box in the third group corresponds to one of the years.

7. The method of claim 6, wherein the set of marks is made by checking one box from each of the first, second, and third groups.

8. The method of claim 7, further comprising:
    resolving the checking of multiple boxes within one of the first, second, or third groups, including
        receiving multiple sets of coordinates corresponding to the multiple boxes, and
        determining which of the multiple sets of coordinates was captured by the capture device last.

9. The method of claim 4,
    wherein the paper form is attached to the capture device, the paper form including a calendar displaying the days in a month.

10. The method of claim 1, further including:
    receiving an identification of the paper form; and
    retrieving from memory the predefined coordinates based on the identification.

11. A system, comprising:
    a memory;
    a processor in communication with the memory, the processor executing a set of instructions to:
    receive a set of coordinates from a capture device, the set of coordinates indicating where on a paper form a set of marks was made without the use of a graphical user interface;
    retrieve from the memory predefined coordinates indicating where each set of marks corresponding to a date is expected to be made on the capture device;
    compare the set of coordinates to the predefined coordinates;
    determine which of the predefined coordinates is the closest match to the set of coordinates; and
    store the date corresponding to the determined predefined coordinates.

12. The system of claim 11, the processor further to execute instructions to receive additional capture data that indicates when and where the set of marks were made on the paper form.

* * * * *